United States Patent [19]

Akao

[11] Patent Number: 5,225,466
[45] Date of Patent: Jul. 6, 1993

[54] RESIN COMPOSITION FOR ARTICLES MOLDED BY INJECTION MOLDING FOR PHOTOGRAPHIC PHOTOSENSITIVE MATERIALS

[75] Inventor: Mutsuo Akao, Kanagawa, Japan

[73] Assignee: Fuji Photo Film Co., Ltd., Minami-ashigara, Japan

[21] Appl. No.: 163,313

[22] Filed: Mar. 2, 1988

[30] Foreign Application Priority Data

Mar. 4, 1987 [JP] Japan .................. 62-047756

[51] Int. Cl.$^5$ .................................... C08J 5/15
[52] U.S. Cl. ............................ 524/108; 524/423; 524/427; 524/437; 524/433; 524/445; 524/449; 524/536; 524/232
[58] Field of Search .............. 524/108, 232, 423, 427, 524/433, 437, 445, 449, 536

[56] References Cited

U.S. PATENT DOCUMENTS

| | | | |
|---|---|---|---|
| 4,147,291 | 4/1979 | Akao et al. | 383/113 |
| 4,258,848 | 3/1981 | Akao et al. | 206/524.2 |
| 4,331,725 | 5/1982 | Akao | 428/138 |
| 4,337,285 | 6/1982 | Akao et al. | 428/35.3 |
| 4,356,224 | 10/1982 | Akao et al. | 428/220 |
| 4,359,499 | 11/1982 | Akao et al. | 428/201 |
| 4,386,124 | 5/1983 | Akao | 428/35.2 |
| 4,411,943 | 10/1983 | Akao | 428/161 |
| 4,411,945 | 10/1983 | Akao et al. | 428/216 |
| 4,436,809 | 3/1984 | Akao et al. | 430/501 |
| 4,452,846 | 6/1984 | Akao | 428/220 |
| 4,469,741 | 9/1984 | Akao | 428/214 |
| 4,513,050 | 4/1985 | Akao | 428/200 |
| 4,565,733 | 1/1986 | Akao | 428/215 |
| 4,565,743 | 1/1986 | Akao | 428/522 |
| 4,576,865 | 3/1986 | Akao | 428/335 |
| 4,579,781 | 4/1986 | Akao | 428/461 |
| 4,584,234 | 4/1986 | Hirose et al. | 428/323 |
| 4,587,175 | 5/1986 | Akao | 428/596 |
| 4,629,640 | 12/1986 | Akao | 428/35.3 |
| 4,639,386 | 1/1987 | Akao | 428/36,92 |
| 4,653,640 | 3/1987 | Akao | 206/445 |
| 4,661,395 | 4/1987 | Akao | 428/213 |
| 4,661,401 | 4/1987 | Akao | 428/215 |
| 4,663,218 | 5/1987 | Akao | 428/212 |
| 4,687,692 | 8/1987 | Akao | 428/137 |
| 4,708,896 | 11/1987 | Akao | 428/212 |
| 4,730,778 | 3/1988 | Akao et al. | 428/215 |

FOREIGN PATENT DOCUMENTS

| | | | |
|---|---|---|---|
| 004651 | 3/1978 | European Pat. Off. | |
| 0079214 | 5/1983 | European Pat. Off. | 524/232 |

Primary Examiner—Joseph L. Schofer
Assistant Examiner—Peter D. Mulcahy
Attorney, Agent, or Firm—Burns, Doane, Swecker & Mathis

[57] ABSTRACT

Resin compositions for use in molding articles by injection molding comprise 50 to 90 wt. % of polypropylene resin, 9 to 48.5 wt. % of linear low density polyethylene resin, 0.05 to 15 wt. % of light-shielding material, 0.05 to 40 wt. % of reinforcing material, 0.05 to 6 wt. % of lubricant, and oxidation inhibitor present in an amount of less than 0.5 wt. %. These resin compositions display very little mold shrinkage and have excellent size accuracy. They also have outstanding rigidity, physical strength, heat resistance, wear resistance and slipping characteristics. They are readily molded by injection molding, and are relatively inexpensive. Articles molded from the resin compositions according to the invention are well adapted for use as photographic photosensitive materials.

9 Claims, 2 Drawing Sheets

FIG. I
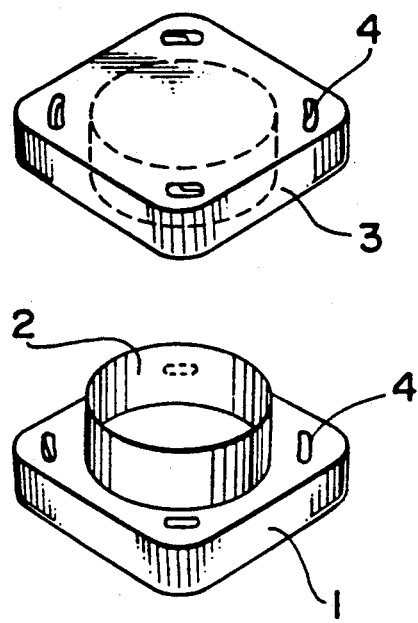
FIG. 2
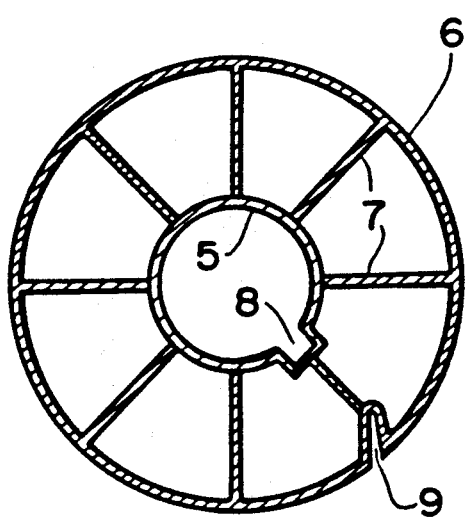

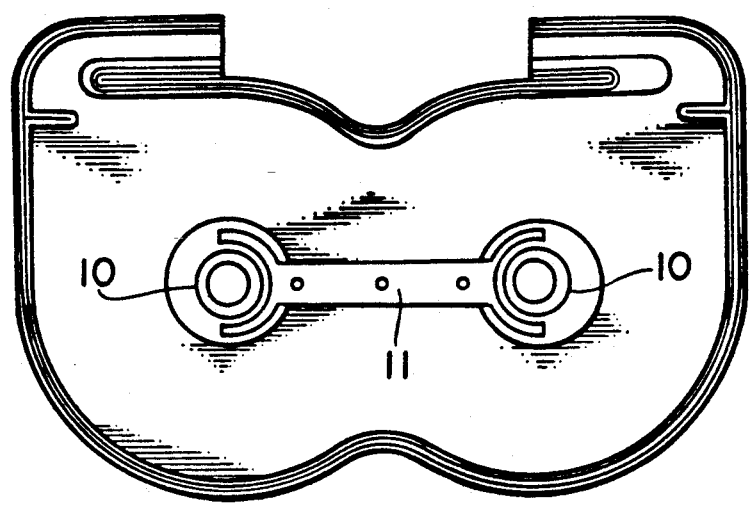
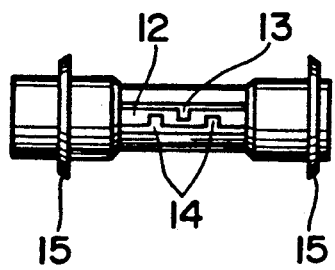
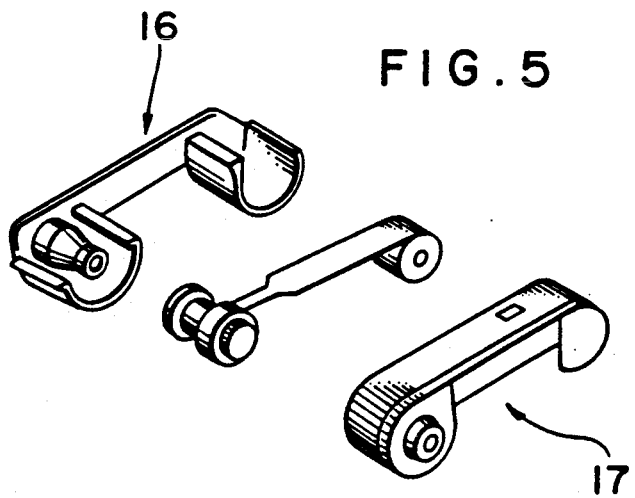

RESIN COMPOSITION FOR ARTICLES MOLDED BY INJECTION MOLDING FOR PHOTOGRAPHIC PHOTOSENSITIVE MATERIALS

BACKGROUND OF THE INVENTION

1. Field of the Invention

This invention relates to a resin composition for use in molding articles by injection molding requiring light-shielding property used for photographic photosensitive materials. More particularly, this invention relates to a resin composition for the articles, such as instant film pack, spool for photographic film, photographic film cartridge, container for strip materials and sheets for loading in a light room, photographic film camera, lens attached film and magazine for 8 mm film.

2. Description of the Prior Art

Such molded articles were usually composed of high-impact polystyrene resin blended with carbon black for securing light-shielding and synthetic rubber such as butadiene rubber for reinforcement. While, in the case of requiring particular strength or heat resistance, ABS resin was employed. These molded articles are disclosed, for example, in Japanese Patent KOKOKU No. 56-16414, Japanese Patent KOKAI Nos. 57-207248, 58-203437, 60-14237 and 61-48841 and Japanese Utility Model KOKAI Nos. 61-86367 and 61-128256.

The above molded articles are required to be positioned accurately and to be flat at the focal plane, and therefore, the materials composing these articles are necessary to have a small contraction coefficient and the rigidity capable of resisting deformation. Besides, in the case of the core for photographic photosensitive strip material, the spool for photographic film and the like, accuracy to size is required for securing loading ability of photographic film in camera and light-shielding, and furthermore, wear resistance and slipping character are also required because of rotating in camera. In the case of photographic film camera and the film pack used for instant photographic system, accuracy to size, wear resistance and slipping character are required similarly, and physical strength is also necessary in order to prevent fogging of the film by broken. Since these molded articles are occasionally used out of doors in the sunshine or left in a car, heat resistance and impact strength particularly at a low temperature are also necessary.

However, the above high-impact polystyrene resin blended with carbon black is insufficient in heat resistance and impact strength. For example, when the molded article was left in a car sunshined in summer, it was sometimes deformed to interfere with its usability. Moreover, the slipping character is also insufficient, even though an usual commercial lubricant is blended. Therefore, it has been reported that the slipping character is secured by coating at least one of the surfaces to contact with each other of the spool and the cap of a photographic film cartridge with a lubricant such as wax, paraffin oil, higher fatty acid ester or silicone (Japanese Utility Model KOKAI No. 53-155638).

The article composed of the ABS resin blended with carbon black is sufficient in most of the necessary properties other than slipping character. However, it is expensive and injection moldability of this resin is inferior.

SUMMARY OF THE INVENTION

An object of the invention is to provide a resin composition for the articles molded by injection molding for photographic photosensitive materials having a small contraction coefficient and therefore excellent in accuracy to size.

Another object of the invention is to provide a resin composition for the articles molded by injection molding for photographic photosensitive materials excellent in heat resistance, slipping character, physical strength, wear resistance and rigidity.

Another object of the invention is to provide a resin composition for the articles molded by injection molding for photographic photosensitive materials excellent in injection moldability.

Still another object of the invention is to provide such a resin composition being inexpensive.

The inventor has investigated in order to achieve such objects, and succeeded to complete the resin composition achieved these objects by combining polypropylene resin with linear low density polyethylene resin and further adding necessary additives. As the resin for the articles molded by injection molding for photographic photosensitive materials, polypropylene is insufficient in physical strength and accuracy to size, and it has also problems in rigidity, heat resistance, the generation of bottom sink mark, etc. While, linear low density polyethylene resin is inferior in injection moldability to cause resin remains at gate, stringiness and the like, and it has also problems in rigidity, wear resistance, heat resistance and the like. The present inventor has achieved the aforementioned objects by combining these resins.

Such a resin composition of the invention comprises 50 to 90 wt. % of polypropylene resin, 9 to 48.5 wt. % of linear low density polyethylene resin, 0.05 to 15 wt. % of light-shielding material, 0.05 to 40 wt. % of reinforcing material, 0.05 to 6 wt. % of lubricant, and oxidation inhibitor present in an amount less than 0.5 wt. %, preferably less than 0.2 wt. %.

BRIEF DESCRIPTION OF THE DRAWINGS

FIGS. 1 to 5 illustrate the examples of the articles molded by injection molding for photographic photosensitive materials.

FIG. 1 is a perspective view indicating a light-shielding case for photographic roll film of which the lid is opened.

FIG. 2 is a sectional view of a core for photographic photosensitive strip material.

FIG. 3 is a plan view of a magazine for 8 mm film.

FIG. 4 is a front view of a spool for photographic film.

FIG. 5 is an exploded perspective view of a K-16 film cartridge.

DETAILED DESCRIPTION OF THE INVENTION

The polypropylene resin may be a homopolypropylene resin or a random type polypropylene resin or a block type polypropylene resin being a propylene-ethylene copolymer resin. Representative polymerization methods to produce the polypropylene resin include the Ziegler catalyst method using a composite catalyst of titanium tetrachloride and triethylaluminium in a saturated hydrocarbon solvent and the Natta catalyst method using a composite catalyst of titanium trichloride and triethylaluminum. As other polymerization methods, Standard Oil Process, Phillips process and Sun Oil process are known. Examples of commercial polypropylene resin are "NISSEKI POLYPRO" (Nippon Petrochemicals Co., Ltd.), "UBE POLYPRO" (UBE Industries Ltd.), "SHO-ALLOMER" (Showa Denko K.K.), "SUMITOMO NOBLEN" (Sumitomo Chemical Co., Ltd.), "MITSUBISHI NOBLEN" (Mitsubishi Petrochemical Co., Ltd.), "CHISSO POLYPRO" (Chisso Corp.) "TOKUYAMA POLYPRO" (Tokuyama Soda K.K.), "MITSUI SEKIYUKAGAKU POLYPRO" (Mitsui Petroleum Chemical Industries Co., Ltd.) and "MITSUI NOBLEN" (Mitsui Toatsu Chemical Inc.).

Preferable polypropylene resins are propylene-ethylene copolymer resins, and the propylene-ethylene random copolymer resin composed of 90 to 99 wt. % of propylene unit and 1 to 10 wt. % of ethylene unit is particularly preferable. Suitable melt index (MI, ASTM D-1238) of the polypropylene is 10 to 80 g/10 minutes. Particularly, the molded article having a high accuracy to size can be obtained by using the polypropylene resin having a MI of 20 to 60 g/10 minutes.

The polypropylene resin content in the resin composition of the invention is 50 to 90 wt. %, and 60 to 80 wt. % is preferable.

The linear low density polyethylene (L-LDPE) resin is a copolymer of ethylene and $\alpha$-olefin. The number of carbon atoms in $\alpha$-olefin is 3 to 13, and examples are butene-1, 4-methylpentene-1, hexene-1, heptene-1 and octene-1. The $\alpha$-olefin content is usually 0.5 to 15 mol. % of the polymer. The density of the L-LDPE resin is low or medium density, and it is usually in the range of 0.87 to 0.95 g/cm$^3$. As the polymerization process, there are low pressure or medium pressure vapor phase method and liquid phase method and modified high pressure method of ionic polymerization. Examples of commercial L-LDPE resins are "UNIPOLE" (UCC), "DOWLEX" (Dow Chemical Co., Ltd.), "STAMILEX" (DSM), "SUCLEAR" (Dupont de Nemour, Canada), "MARLEX" (Phillips Co., Ltd.), "ULTZEX" and "NEOZEX" (Mitsui Petroleum Chemical Industries Co., Ltd.), "NISSEKI LINIREX" (Nippon Petrochemicals Co., Ltd.) and "NUC POLYETHYLENE-LL" and "TUFLIN" (Nippon Unicar Co., Ltd.).

Preferable L-LDPE resins in view of moistureproofness, rigidity, physical strength and the like are the L-LDPE resins having an ethylene content of 90 to 99.5 mol. %, i.e. $\alpha$-olefin content of 0.5 to 10 mol. %, a MI (ASTM D-1238) of 4 to 25 g/10 minutes, a density (ASTM D-1505) of 0.915 to 0.935 g/cm$^3$ and the number of carbon atoms in $\alpha$-olefin of 6 to 10, produced by low pressure vapor phase or liquid phase method.

The L-LDPE resin content in the resin composition of the invention 9 to 48.5 wt. %, preferably 15 to 40 wt. %.

The light-shielding material includes every material capable of shielding visible and ultraviolet lights, and representative examples of the light-shielding material are carbon black, aluminum powder including aluminum paste, other metal powders, metal fibers, coloring pigments and dyes. Preferable light-shielding materials are carbon black, aluminum powder, aluminum paste from which low volatile components are removed, and graphite, in view of light-shielding ability, quality and cost.

Carbon blacks are divided into gas black, channel black, oil furnace black, anthracene black, acetylene black, thermal black, Ketschen black, lamp black, vegetable black, animal black, etc. Among these, oil furnace carbon black is preferable in terms of light-shielding ability, cost and improvement of properties. On the other hand, since acetylene black and Ketschen carbon black have antistatic character, they are also preferable, though they are expensive. They may be blended to the oil furnace black in order to improve its character. Suitable pH of carbon black is at 5 to 9, particularly at 6 to 8, and suitable mean particle size is 10 to 50 m$\mu$. Particularly, the oil furnace carbon black having pH 6 to 9 and mean particle size of 15 to 30 m$\mu$ is preferable. By using the carbon black of such pH and particle size, the molded article having the following merits is obtained. That is, the occurrence of fogging is rare, increase or decrease of photosensitivity scarcely happens, light-shielding ability is large, and the lumps of carbon black and pinholes such as fish eye hardly generate.

The coloring pigments and dyes includes various known ones, such as iron oxide, zinc white, red iron oxide, cadmium pigments, chrome yellows, and the like.

The content of the light-shielding material is 0.05 to 15 wt. %.

The reinforcing material includes calcium carbonate, potassium titanate fiber, barium sulfate, magnesium carbonate, magnesium hydroxide, glass fiber, silica, titanium dioxide, alumina, talc, pyrophyllite, kaolin, sericite, mica, clay, etc. The content of the reinforcing material is 0.05 to 40 wt. %.

The lubricant includes oleic acid amide lubricants, erucic acid amide lubricants, stearic acid amide lubricants, bis fatty acid amid lubricants, Silicone lubricants and alkylamine lubricants, and its content is 0.05 to 6 wt. %.

Examples of commercial lubricants suitable for the present invention are as follows:

Oleic acid amide lubricants; "ARMOSLIP-CP" (lion Akzo Co., Ltd.), "NEWTRON" and "NEWTRON E18" (Nippon Fine Chemical Co., Ltd.), "AMIDE-O" (Nitto Kagaku K.K.), "DIAMID O-200" and "DIAMID G-200" (Nippon Kasei Chemical Co., Ltd.), etc.

Erucic acid amide lubricants; "ALFLOW P-10" (Nippon Oil and Fats Co., Ltd.), etc.

Stearic acid amide lubricants; "ALFLOW S-10" (Nippon Oil and Fats Co., Ltd.), "NEWTRON 2" (Nippon Fine Chemical Co., Ltd.), "DIAMID 200" (Nippon Kasei Chemical Co., Ltd.), etc.

Bis fatty acid amide lubricants; "BISAMIDE" (Nitto Kagaku K.K.), "DIAMID-200 BIS" (Nippon Kasei Chemical Co., Ltd.), "ARMOWAX-EBS" (Lion Akzo Co., Ltd.), etc.

Silicone lubricants; dimethylpolysiloxanes and carboxyl modified dimethylpolysiloxanes, "SHINETSU SILICONE" (Sinetsu Chemical Co., Ltd.), "TORAY SILICONE" (Toray Silicone Co., Ltd.), etc.

Alkylamine lubricants; "ELECTROSTRIPPER TS-2" (Kao Corp.), etc.

The oxidation inhibitor is added in order to prevent coloring, and suitable oxidation inhibitors for the resin composition of the invention are phenol oxidation inhibitors, a sulfur-containing oxidation inhibitors or a phosphorus-containing oxidation inhibitors. The phenol oxidation inhibitors include n-octadecyl-3-(3',5'-di-t-butyl-4'-hydroxyphenyl)propionate, 2,6-di-t-butyl-4-methylphenol, 2,6-di-t-butyl-p-cresol, 2,2'-methylenebis(4-methyl-6-t-butylphenol), 4,4'-thiobis(3-methyl(3-methyl-6-t-butylphenol), 4,4'-butylidenebis(3-methyl-6-t-butylphenol), Stearyl-$\beta$-(3,5-di-4-butyl-4-hydroxyphenyl)propionate, 1,1,3-tris(2-methyl-4-hydroxy-5-t- butylphenyl)butane, 1,3,5-trimethyl-2,4,6-tris(3,5-di-t-butyl-4-hydroxybenzyl) benzene and tetrakis[methylene-3(3',5'-di-t-butyl-4'-hydroxyphenyl)propionate]methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridencyl-3,3'-thiodipropionate. The phosphorus-containing oxidation inhibitors include trinonylphenylphosphite and triphenylphosphite. Among them, the phenol oxidation inhibitors are the most preferable. Commercial products belonging to the phenol oxidation inhibitors include various "IRGANOX" (CIBA-GEICY AG) and "SUMILIZER BHT", "SUMILIZER BP-76", "SUMILIZER WX-R" and "SUMILIZER BP-101" (SUMITOMO CHEMICAL CO., LTD.). Two or more oxidation inhibitors may be used in combination. The content of the oxidation inhibitor is less than 0.5 wt. %, usually 0.001 to 0.3 wt. %, preferably 0.01 to 0.2 wt. %. In general, about 0.25 wt. % of oxidation inhibitor is necessary to prevent coloring. Whereas, in the case of the resin composition of the invention, the content of less than 0.5 wt. %, mostly less than 0.3 wt. % is sufficient, since the blended carbon black also inhibits oxidation. When the resin composition contains carbon black in quantity, the oxidation inhibitor may be blended.

Various additives in addition to the mentioned previously may be added to the resin for cap. Examples of the additives are described below.

(1) Plasticizer;
  phthalic acid esters, glycol esters, fatty acid esters, phosphoric acid esters, etc.
(2) Stabilizer;
  lead compounds, cadmium compounds, zinc compounds, alkaline earth metal compounds, organic tin compounds, etc.
(3) Antistatic agent;
  cation surfactants, anion surfactants, nonion surfactants, ampholytic surfactants, etc.
(4) Flame retardant;
  phosphoric acid esters, phosphoric acid ester halides, halides, inorganic materials, polyols containing phosphorous, etc.
(5) Blowing agent;
  inorganic blowing agents including ammonium carbonate and sodium hydrogencarbonate, organic blowing agent including nitroso compounds and azo compounds, etc.
(6) Nucleating agent;
  inorganic nucleating agents, organic nucleating agents (such as dibenzylidenesorbitol)
(7) Deterioration preventing agent;
  ultraviolet absorber, metal deactivator, peroxide decomposing agent, etc.
(8) Coupling agent;
  silane compounds, titanium compounds, chromium compounds, aluminum compounds, etc.
(9) Various thermoplastic resins, rubbers, etc.

Among these, it is preferably to blend the nucleating agent and/or the coupling agent for improving the dispersion of the reinforcing material and the light-shielding material. While, dispersibility of carbon black and the reinforcing material is improved by combining a stratified talc, pyrophyllite, kaolin or sericite with another reinforcing material.

The nucleating agent is preferably organic nucleating agent, and suitable nucleating agents are 1,3,2,4-dibenzylidene sorbitol, 1,3,2,4-di (methylbenzylidene) sorbitol, 1,3,2,4-di(alkylbenzylidene) sorbitol and 1,3,2,4-(para-ethylbenzylidene) sorbitol. The suitable content of the nucleating agent is usually 0.01 to 0.5 wt. %. By adding the nucleating agent, the crystallinity of the polypropylene resin and the L-LDPE resin is raised, and thereby, the lubricant easily bleeds to the surface of molded article to raise slipping character. In addition, rigidity and physical strength are further improved.

By blending the coupling agent, injection moldability is further improved.

As the method of blending, these additives may be mixed with the resin composition of the invention by using a mixer such as dry blender, V-type blender, corn blender, ribbon blender, Henschel mixer, or Nauter mixer, and then pelletized preferably by a twin-screw kneader. However, another known pelletizer may also be used, or the mixture may direct be introduced into molding machine.

Examples of the article molded by injection molding by using the resin composition of the invention are illustrated in FIGS. 1 to 5. The molded article of FIG. 1 is a light-shielding case for photographic roll film. The case body 1 is provided with a film receiving portion 2 in its center, and besides, the body 1 and its lid 3 are provided with the engaging portions 4 engaging these with each other. The molded article of FIG. 2 is a core for photographic photosensitive strip material, and it is composed of an inner cylinder 5, an outer cylinder 6, ribs 7 connecting these, a key way 8 and a slit groove 9. The shaft of a movie projector is inserted into the inner cylinder 5, and a photographic film is coiled around the outer cylinder 6. A terminal of the film is inserted into the slit groove 9. The molded article of FIG. 3 is a magazine for 8 mm film, and a metal spring 11 is provided between the cores 10 of the 8 mm roll film. The molded article of FIG. 4 is a spool for photographic film, and the winding shaft is provided with a slit 12 for film insertion in the longitudinal direction. A film presser rib 13 is formed on one side edge of the slit 12, and two film engaging claws 14 are formed on the other side edge. Flanges 15 are formed near both ends of the spool. The molded article of FIG. 5 is a K-16 film cartridge. This cartridge is composed of a body member 16 and a cover member 17.

In the resin composition of the invention, the polypropylene resin secures injection moldability, rigidity and heat resistance. It also improves for the blended lubricant to exhibit slipping character. Particularly, when a small amount of a fatty acid amide lubricant being inexpensive is added, slipping character largely appears. The L-LDPE resin makes mold shrinkage little, and it prevents the lowering of physical strength caused by the addition of the light-shielding material and the reinforcing material. It also improves the uniform dispersion of them. The molding troubles such as short shot, stringiness and gate mark being the natural defects of the L-LDPE resin are prevented by lowering its content to less than 48.5 wt. %. The light-shielding material secures the light-shielding necessary to the articles molded by injection molding for photographic photosensitive materials. When the content is less than 10 wt. %, it also acts as a modifier to improve the physical strength of the L-LDPE resin. The reinforcing material improves physical strength, heat resistance, accuracy to size, rigidity and the like. The lubricant improves injection moldability, wear resistance, slipping character, accuracy to size, integrating ability and the like. It also improves the dispersibility of the light-shielding material, the reinforcing material and the like. The above effects largely appears by using dimethylpolysiloxane or a modified silicone. The resin composition of the invention is excellent in little mold shrinkage and accuracy to size. It also excellent in rigidity, physical strength, heat resistance, wear resistance and slipping character. Its injection moldability is good, and moreover, it is inexpensive.

EXAMPLE

EXAMPLE 1

79.9 wt. % of propylene-ethylene random copolymer resin having the propylene unit of 98 wt. % and the ethylene unit of 2 wt. % and a melt index of 40 g/10 minutes as the polypropylene resin, 20 wt. % of L-LDPE resin, a copolymer of ethylene and 4-methylpentene-1, having a melt index of 10 g/10 minutes and a density of 0.925 g/cm$^3$, 0.3 wt. % of oil furnace carbon black having a mean particle size of 21 m$\mu$as the light-shielding material, 15 wt. % of talc having a mean particle size of 2.7 $\mu$ as the reinforcing material, 0.3 wt. % of oleic acid amide lubricant ("Armoslip CP", Lion Akzo Co., Ltd.), 0.2 wt. % of 1,3,2,4-dibenzylidene sorbitol (E.C. Chemical Ind. Co., Ltd.) as a nucleating agent, and 0.1 wt. % of an oxidation inhibitor ("Irganox 1010", Ciba-Geigy A.G.) were blended by a tumbler blender, and pelletized by a twin-screw kneader (Ikegai Corp.) The pellets were dried, and the light-shielding case for photographic roll film of FIG. 1 was molded by using an injection molding machine (Sumitomo Heavy Industries Ltd.) at a mold clamping pressure of 150 t at 260° C. The properties of the molded product are shown in Table 1.

Comparative Product I

Using a high-impact polystyrene resin having a MI of 11.0 g/10 minutes containing 2 wt. % of butadiene rubber instead of the propylene-ethylene random copolymer resin and the L-LDPE resin, the same amount of the same light-shielding material, reinforcing material, lubricant, nucleating agent and oxidation inhibitor as Example 1 were used, and the same light-shielding case as Example 1 was molded. The properties of the molded product are also shown in Table 1.

Conventional Product I

Using the propylene-ethylene random copolymer resin alone instead of the combination of the propylene-ethylene random copolymer resin and the L-LDPE resin, the same amount of the same light-shielding material, reinforcing material, lubricant, nucleating agent and oxidation inhibitor as Example 1 were used, and the same light-shielding case as Example 1 was molded. The properties of the molded product are shown in Table. 1.

Comparison of Properties

TABLE 1

| Properties (Unit) | Product of the Invention I | Comparative Product I | Conventional Product I |
| --- | --- | --- | --- |
| Resin Composition | | | |
| Melt Index (g/10 min.) | 35 | 11.0 | 4.0 |
| Izod Impact Strength (kg · cm/cm) | 7.6 | 3.0 | 5.2 |
| | A | D-E | B |
| Initial Bending Elastic Modulus | 215000 | 27000 | 14200 |
| | B | A | D |
| (kg/cm$^2$) | | | |
| Statical Friction Coefficient ($\mu$) | 0.16 | 0.33 | 0.20 |
| | A | D-E | B |
| Vicat Softening Point (°C.) | 156 | 96 | 142 |
| | A | D-E | B |
| Light-Shielding Case | | | |
| Dropping Strength | A | E | C |
| Warp | A | C | A |
| Bottom Sink Mark | B | B | D |
| Heat Resistance | A | D | B |
| Injection Moldability | A | C | A |

Evaluations in Table 1 were carried out as follows:

| A | very excellent | B | excellent |
| --- | --- | --- | --- |
| C | practical | D | having a problem |
| E | impractical | | |

Testing methods are as follows:

| | |
| --- | --- |
| Melt Index | ASTM D-1238 |
| Izod Impact Strength | ASTM D-256 |
| Initial Bending Elastic Modulus | ASTM D-790 |
| Statical Friction Coefficient | Between the sheets molded by using each resin composition |
| Vicat Softening Point | ASTM D-1525 |
| Dropping Strength, Warp and Bottom Sink Mark | Measured by using a light-shielding case for photographic roll film |
| Heat Resistance | Deformation after leaving for 3 hours in the sunshine of 80,000 luxes |
| Injection Moldability | Judged by injection molding pressure, release ability from mold, etc. at the time of injection molding of the light-shielding case |

EXAMPLE 2

Using the same resin composition as Example 1, the core for photographic photosensitive strip material of FIG. 2 was molded by injection molding, and compared with the same core molded by using the same resin composition as employed in Comparative product I as to the properties described in Table 1. The results were similar to Example 1, and the product of the invention was superior particularly in physical strength and injection moldability to the comparative product.

EXAMPLE 3

Using 0.3 wt. % of aluminum paste instead of 0.3 wt. % of oil furnace carbon black, the same resin composition as Example 1 was used, and the magazine for 8 mm film of FIG. 3 was molded by injection molding, and compared with the same magazine molded by using the same resin composition as employed in Comparative product I except that 0.3 wt. % of aluminum paste was blended instead of 0.3 wt. % of carbon black. The results were similar to Example 1, and the product of the invention was superior particularly in physical strength and injection moldability to the comparative product. In addition, since the appearance was silver, the temperature elevation in the sunshine was little.

EXAMPLE 4

Using the same resin compositions as Example 1 and Comparative product I, the spool for photographic film of FIG. 4 and the K-16 film cartridge of FIG. 5 were molded by injection molding. The results of comparing the properties described in Table 1 were similar to Example 1, and the products of the invention were superior particularly in physical strength and injection moldability to the comparative products. Moreover, the products of the invention were excellent in slipping character compared with the comparative products, and the drawing out torque of photographic film was little. Therefore, a lubricant was not necessary to apply on the rotating portion such as flanges.

I claim:

1. A resin composition for use in molding articles by injection molding for photographic photosensitive materials, comprising 50 to 90 wt. % of polypropylene resin, 9 to 48.5 wt. % of linear low density polyethylene resin, which is a copolymer of ethylene and α-olefin having 6-10 carbon atoms, 0.05 to 15 wt. % of light-shielding material, 0.05 to 40 wt. % of reinforcing material, 0.05 to 6 wt. % of lubricant, oxidation inhibitor present in an amount of less than 0.5 wt. % and a nucleating agent selected from 1,3,2,4-dibenzylidene sorbitol, 1,3,2,4-di(methylbenzylidene)sorbitol, 1,3,2,4-di(alkylbenzylidene)sorbitol and 1,3,2,4-(para-ethylbenzylidene)sorbitol.

2. The resin composition of claim 1 wherein said polypropylene resin is a propylene-ethylene random copolymer resin composed of 90 to 99 wt. % of propylene unit and 1 to 10 wt. % of ethylene unit.

3. The resin composition of claim 1 wherein the melt index of said polypropylene resin is 10 to 80 g/10 minutes.

4. The resin composition of claim 1 wherein the melt index of said linear low density polyethylene resin is 4 to 25 g/10 minutes.

5. The resin composition of claim 1 wherein said light-shielding material is a member selected from carbon black, aluminum powder, aluminum paste and graphite.

6. The resin composition of claim 1 wherein said reinforcing material is a member selected from calcium carbonate, potassium titanate fiber, barium sulfate, magnesium carbonate, magnesium hydroxide, glass fiber, silica, titanium dioxide, alumina, talc, mica and clay or a mixture thereof.

7. The resin composition of claim 1 wherein said lubricant is a member selected from oleic acid amide lubricants, stearic acid amide lubricants, bis fatty acid amide lubricants, silicone lubricants and alkylamine lubricants.

8. The resin composition of claim 1 containing a coupling agent.

9. The resin composition of claim 1 molded into a light-shielding case for photographic roll film, a core for photographic photosensitive strip material, a magazine for 8 mm film, a spool for photographic film or a K-16 film cartridge.

* * * * *